United States Patent [19]

Sakoe

[11] 4,059,725
[45] Nov. 22, 1977

[54] AUTOMATIC CONTINUOUS SPEECH RECOGNITION SYSTEM EMPLOYING DYNAMIC PROGRAMMING

[75] Inventor: Hiroaki Sakoe, Tokyo, Japan

[73] Assignee: Nippon Electric Company, Ltd., Tokyo, Japan

[21] Appl. No.: 753,072

[22] Filed: Dec. 21, 1976

Related U.S. Application Data

[63] Continuation of Ser. No. 665,759, March 11, 1976, abandoned.

[30] Foreign Application Priority Data

Mar. 12, 1975 Japan .................................. 50-29891
Oct. 31, 1975 Japan .................................. 50-132003

[51] Int. Cl.² .............................................. G10L 1/00
[52] U.S. Cl. ................................................ 179/1.5 D
[58] Field of Search .............................. 235/152, 181; 179/1.5 A, 1.5 D, 1.5 B

[56] References Cited

U.S. PATENT DOCUMENTS

| 3,700,815 | 10/1972 | Doddington et al. ............ 179/1.5 B |
| 3,816,722 | 6/1974 | Sakoe ............................ 179/1.5 A X |
| 3,943,295 | 3/1976 | Martin ............................ 179/1.5 A |

Primary Examiner—Kathleen H. Claffy
Assistant Examiner—E. S. Kemeny
Attorney, Agent, or Firm—Sughrue, Rothwell, Mion, Zinn and Macpeak

[57] ABSTRACT

A speech pattern recognition system for continuous speech is disclosed. The system includes calculating means which calculates similarity measures between an input pattern and all of the series of patterns including reference word-patterns arranged in all possible orders through a pattern matching process without resorting to a segmentation process. The reference pattern which provides the maximum similarity measure is adopted as the recognized result.

5 Claims, 11 Drawing Figures

AUTOMATIC CONTINUOUS SPEECH RECOGNITION SYSTEM EMPLOYING DYNAMIC PROGRAMMING

This is a Continuation, of application Ser. No. 665,759, filed Mar. 11, 1976, now abandoned.

BACKGROUND OF THE INVENTION

This invention relates to a system for automatically recognizing continuous speech composed of continuously spoken words.

Voice recognition systems have been much in demand as input devices for putting data and programs into electronic computers and practical systems for automatically recognizing a speech are expected.

As is known in the art, it is possible to present a voice pattern with a sequence of Q-dimensional feature vectors. In a conventional voice recognition system, such as the one described in the P. Denes and M. V. Mathews article entitled "Spoken Digit Recognition Using Time-frequency Pattern Matching" (*The Journal of Acoustical Society of America*, Vol. 32, No. 11, November 1960) and another article by H. A. Elder entitled "On the Feasibility of Voice Input to an On Line Computer Processing System" (*Communication of ACM*, Vol. 13, No. 6, June 1970), the pattern matching is applied to the corresponding feature vectors of a reference pattern and of a pattern to be recognized. More particularly, the similarity measure between these patterns is calculated based on the total sum of the quantities representative of the similarity between the respective feature vectors appearing at the corresponding positions in the respective sequences. It is, therefore, impossible to achieve a reliable result of recognition in those cases where the positions of the feature vectors in one sequence vary relative to the positions of the corresponding feature vectors in another sequence. For example, the speed of utterance of a word often varies as much as 30 percent in practice. The speed variation results in a poor similarity measure even between the voice patterns for the same word spoken by the same person. Furthermore, for a conventional voice recognition system, a series of words must be uttered word by word thereby inconveniencing the speaking person and reducing the speed of utterance.

In order to recognize continuous speech composed of continuously spoken words, each voice pattern for a word must separately be recognized. A proposal to meet this demand has been made in the U.S. Pat. No. 3,816,722 entitled "COMPUTER FOR CALCULATING THE SIMILARITY BETWEEN PATTERNS AND PATTERN RECOGNITION SYSTEM COMPRISING THE SIMILARITY COMPUTER" filed jointly by the inventor of this case. In this system, continuous speech is separated word by word by using the dynamic programming. However, separation of continuous speech into words (segmentation) is not yet well established.

SUMMARY OF THE INVENTION

It is, therefore, an object of this invention to provide a continuous speech recognition system in which the separation of continuous speech can be well achieved.

According to a basic aspect of this invention, similarity measures between all of the series of patterns including reference word-patterns arranged in all possible orders constitute reference patterns and an input pattern are calculated through the pattern matching process without resorting to a segmentation process. The reference pattern which provides the maximum similarity measure is adopted as a recognized result. The continuous speech pattern recognition process with respect to all the reference patterns is performed through three steps so as to achieve a practical operational speed.

In the first step, similarity measures are calculated between the reference patterns and a partial pattern of the input pattern extending from a given time point (a start point) to another given time point (an end point). Thus, the maximum similarity measure and the word corresponding thereto are obtained as a partial similarity measure and a partial recognized result for the partial pattern, respectively. The partial similarity measures and the partial recognized results are then stored at the start and end points. The step is repeated for all the start and end points to form a table stored in the memory device.

In the second step, referring to the table, the partial pattern series is selected so that a plurality of partial patterns included therein are laid without overlapping and spacing and that the sum of the partial similarity measures in the series is maximized.

In the final step, the partial recognized results corresponding to the partial patterns obtained in the second step are extracted from the table to provide a final result.

The calculations in the first and second steps are achieved in practice in accordance with the "Dynamic Programming" described on pp. 3–29 of a book entitled "Applied Dynamic Programming" published in 1962 by Princeton University Press.

BRIEF DESCRIPTION OF THE DRAWINGS

The features and advantages of this invention will be understood from the following detailed description of the preferred embodiments taken in conjunction with the accompanying drawings, wherein.

DETAILED DESCRIPTION OF THE PREFERRED EMBODIMENTS

Referring to FIGS. 1 to 4, the principle of a continuous speech recognition system according to this invention will be described.

As mentioned hereinabove, a speech pattern can be represented by a time sequence of Q-dimensional feature vectors. An input speech pattern may be given by $$A = a_1, a_2 - a_i - a_I \tag{1}$$

where $a_i$ stands for a feature vector for the $i$-th time point in the input pattern, and may be given by $$a_i = (a_{1i}, a_{2i} - a_{Qi})$$

Assume that the continuous speech to be recognized is a series of numerals (0, 1, 2, ... $n$ ... 9), and a reference word-pattern $B^n$ ($n=0$ to 9) is composed of $J_n$-number of feature vectors. The reference word-pattern $B^n$ may be given by $$B^n = b_1{}^n, b_2{}^n, - b_j{}^n - b_{J_n}{}^n \tag{2}$$

where $b_j{}^n$ stands for a feature vector for the $j$-th time point in the reference word-pattern and may be given by $$b_j{}^n = (b_{1j}{}^n, b_{2j}{}^n - b_{Qj}{}^n)$$

$J_n$ corresponds to a time period of the reference word-pattern.

For simplicity, the reference word-pattern and its feature vector is represented by $$B = b_1, b_2, - b_j - b_J \tag{3}$$

$$b_j = (b_{1j}, b_{2j} - b_{Qj})$$

In the continuous speech recognition system of this invention, the reference pattern for the continuous speech is represented as a series of the reference word-patterns for the numerals which are pronounced word by word. In other words, a pattern for the continuous speech by continuously pronouncing numerals $[n(1), n(2), \ldots n(x), \ldots n(Y)]$ is represented by a pattern series composed of the respective reference word-pattern as follows:

$$\bar{B} = B^{n(1)} \oplus B^{n(2)} - \oplus B^{n(x)} - \oplus B^{n(Y)} \tag{4}$$

and, in the case of a series of reference word-patterns $B^m$ and $B^n$, $$\bar{B} = B^m \oplus B^n = b_1{}^m, b_2{}^m, -b_{J_m}{}^m, b_1{}^n, b_2{}^n, -b_{J_m}{}^n \tag{5}$$

For simplicity, the reference pattern B and its feature vector are represented by $$\bar{B} = \bar{b}_1, \bar{b}_2 - \bar{b}_j - \bar{b}_J$$

$$\bar{b}_j = (\bar{b}_{1j}, \bar{b}_{2j} - \bar{b}_{Qj}) \tag{6}$$

Figure 1:
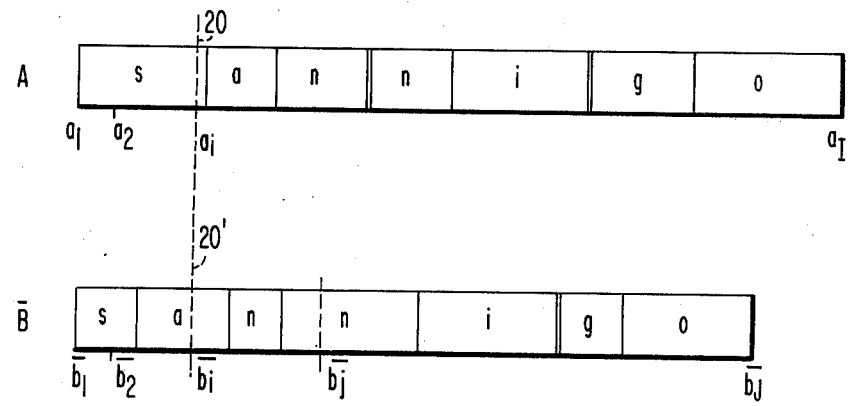
FIG. 1 schematically shows two voice patterns for the same continuous speech.

The components of the vector may be the samples of the outputs, Q in number, of a Q-channel spectrum analyzer sampled at a time point. The feature vectors $a_i$ and $b_i$ situated at the corresponding time positions in the respective sequences for the same speech do not necessarily represent one and the same phoneme, because the speeds of utterance may differ even though the words are spoken by the same person. For example, assume that the patterns A and B are both for a series of phonemes /san-ni-go/ (Japanese numerals for "three-two-five" in English). A vector $a_i$ at a time position 20 represents a pheneme /s/ while another vector $\bar{b}_i$ at the corresponding time point 20' represents different phoneme /a/. With a conventional method of calculating the similarity measure using the summation of $i$ of the correlation coefficients $\gamma(a_i, b_i)$'s, the example depicted in FIG. 1 gives only small similarity, which might result in misrecognition of the pattern in question.

Generally, the duration of each phoneme can vary considerably during actual utterance without materially affecting the meaning of the spoken words. A measure is therefore used for the pattern matching which will not be affected by the variation.

Figure 2:
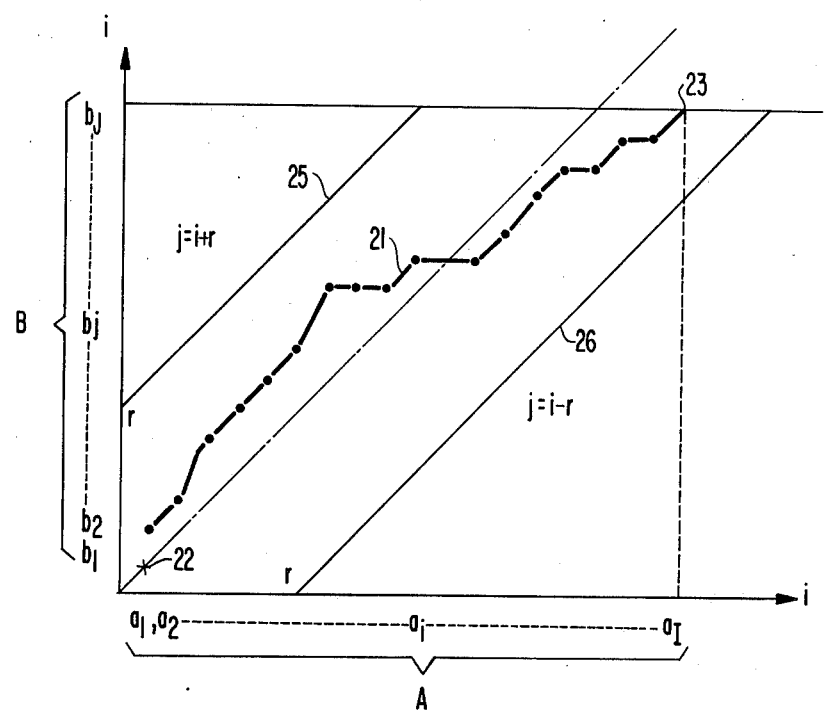
FIG. 2 is a graph for explaining the principles of this invention.

Referring to FIG. 2, the sequences of the feature vectors are arranged along the abscissa $i$ and the ordinate $j$, respectively. According to the invention, a scalar product of the feature vectors $a_i$ and $\bar{b}_j$ is used as the similarity measure $s(a_i, \bar{b}_j)$ between the feature vectors $a_i$ and $\bar{b}_j$ as follows:

$$s(a_i, \bar{b}_j) = \sum_{p=1}^{Q} (a_{pi} \times \bar{b}_{pj}) \tag{7}$$

According to the principle of this invention, the similarity measure $S(A, \bar{B})$ between the input and reference patterns A and $\bar{B}$ is calculated with respect to all of the reference patterns, and the number Y of the reference word-patterns and the corresponding numerals $n(1), n(2), \ldots n(X), \ldots n(Y)$ by which the maximum similarity measure $$\max_{Y, n(1), n(2) - n(X), - n(Y)} [S(A, \bar{B})] \tag{8}$$

is obtained are calculated to obtain a recognized result.

Figure 3A:
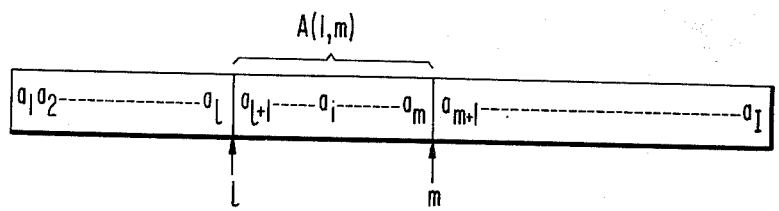
FIGS. 3A and 3B show input patterns for explaining the principles of this invention.

It is noted that direct calculation of the maximum similarity measure represented by expression (8) requires a vast amount of time and adversely affects the cost and the operation time of the system to a certain extent. According to the invention, it has been found as shown in FIG. 3A that the input pattern A is divided by a partial pattern from a given time point (a start point) $l$ to the next given time point (an end point) $m$, which may be represented by $$A(l,m) = a_{l+1}, a_{l+2}, - a_i - a_m \tag{9}$$

Figure 3B:
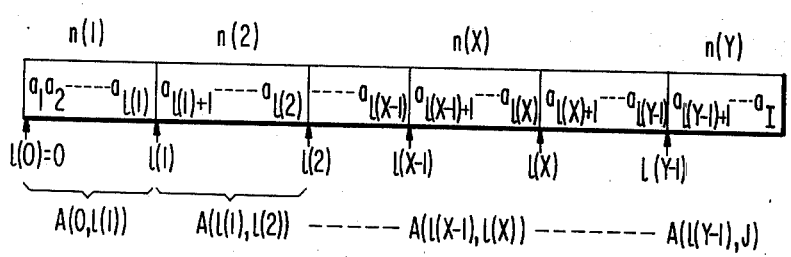

In other words, as shown in FIG. 3B, the input pattern A is divided into Y sets of partial patterns having (Y-1) of breaking points $l(1), l(2), \ldots l(X), \ldots l(Y-1)$.

$$A = A(0, l_{(1)}) \oplus A(l_{(1)}, l_{(2)}) - \oplus A(l_{(x-1)}, l_{(x)}) - \oplus A(l_{(Y-1)}, l_{(x)}) \tag{10}$$

By substituting expressions (4) and (10) for expression (8), the following expression (11) is obtained.

$$\max_{\substack{Y, n(1), n(2) - n(Y) \\ l(1), l(2) - l(Y-1)}} \left[ \sum_{x=1}^{Y} S(A(l_{(x-1)}, l_{(x)}), B^{n(x)}) \right] \tag{11}$$

The maximization of the light term of expression (11) is carried out in two processes; one is the maximizing with respect to the numerals $n(1), n(2), \ldots n(Y)$, and the other to the number Y and the breaking points $l(1), l(2) \ldots l(Y-1)$. This is shown by respect to a certain point $l$), whereby the partial similarity measures and the partial recognized results within the range of line 10 can be obtained. By calculating with respect to all of $l$'s, the partial similarity measure and the partial recognized results within the hatched domain are obtained. The calculation only within the restricted domain makes it possible to reduce its calculation amount.

The first step may be summarized to the following seven sub-steps:

(1-1) Reset $S<l,m>$ to 0, and set $n$ to 0;

(1-2) Set $l$ to 1;

(1-3) Calculate expression (15) within a domain of $m$'s satisfying the expression (19) to obtain $S(A(l,m), B^n) = g(m, J_n)$, and set $m$ to $l + J_n - r\,1$;

(1-4) When $S(A(l,m), B^n) \leq S<l,m>$, jump to (1-5);
When $S(A(l,m), B^n) \leq S<l,m>$, set $S(A(l,m), B^n)$ and $n$ as $s<l,m>$ and $n<l,m>$, respectively;

(1-5) Set $m$ to $m + 1$.
When $m \leq l + J_n + r - 1$, jump to (1-4), and when $m > l + J_n + r - 1$, jump to (1-6);

(1-7) Set $n$ to $n + 1$.
When $n \leq 9$, jump to (1-2), and when $n > 9$, finish.

The second step of the recognition process according to the invention for the maximization calculation with respect to the number Y and the breaking points $l_{(1)}, l_{(2)} - l_{(x)} - l_{(Y-1)}$ in expression (12) by using the dynamic programming will be described.

The expression (12) may be rewritten by using the partial similarity measure $S<l_{(x-1)}, l_{(x)}>$ to $$\max_{l(1), l(2)---l(X)---l(Y-1)} \left[ \sum_{x=1}^{Y} S < l(x-1), l(x) > \right] \quad (22)$$

Assume that $l_{(Y)} = m$ and $$T(m) = \max_{\substack{l(1), l(2)---l(X)---l(Y-1) \\ l(Y) = m}} \left[ \sum_{x=1}^{Y} S < l(x-1), l(x) > \right]$$

the expression (22) may be represented by T(I) (I stands for the time period of the input pattern A). Further, the expression (22) may be represented by $$T(m) = \max_{h < m} [S < h, m > + T(h)]$$

This shows that the dynamic programming is conveniently applicable to the calculation of the expression (22). Thus, the calculation of the recurrence expression given by $$T(m) = \max_{h < m} [S < h, m > + T(h)] \quad (23)$$
where $m = 1 - I$ is carried out, starting from the initial condition $$T(0) = 0 \quad (24)$$

and to T(I) for $m = I$. On the calculation of the recurrence expression (24), $$h(m) = \underset{h < m}{\mathrm{argmax}}\, [S < h,m > + T(h)] \quad (25)$$

where an operator "argmax" stands for "$h$" for which the expression in the square bracket [ ] has a maximum value, is obtained with respect to $m$'s of 1 to I and stored. Then, recognized breaking point $\overline{l_{(x)}}$ representative of optimum value of $l_{(x)}$ in expression (21) is obtained by calculating a recurrence expression given by $$\overline{l_{(x)}} = h(l_{(x+1)}) \quad (26)$$

from the initial condition $l_{(Y)} = J$ to the ultimate recurrence coefficient $l_{(0)} = 0$. The number Y representative of the word number in the input pattern is obtained as the number of X at which $\overline{l_{(x)}}$ becomes 0.

In the final step of the recognition process, a final recognized result having Y numerals given by $$n < \overline{l_{(x-1)}, l_{(x)}} >, X = 1 \sim Y \quad (27)$$

is obtained by referring to the recognized breaking point $\overline{l_{(x)}}$ obtained in the second step and to the partial recognized results $n<l,m>$ obtained in the first step.

Figure 5:
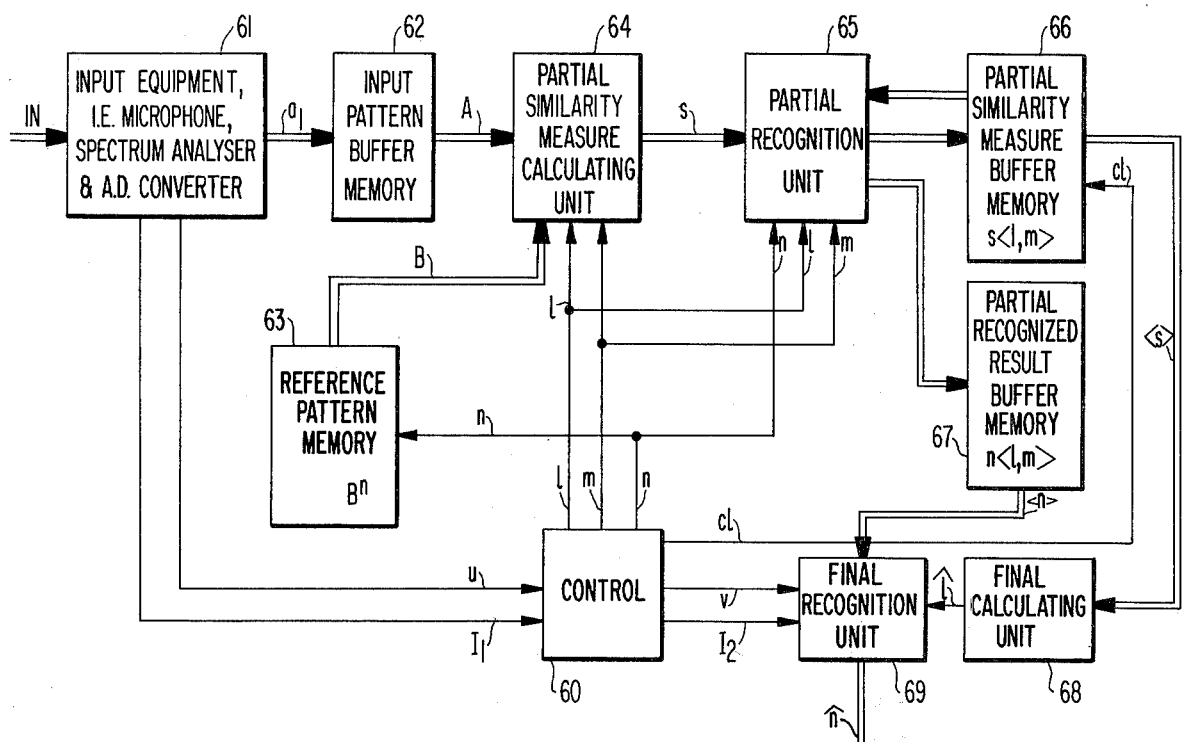
FIG. 5 is a block diagram of a first embodiment of this invention.

Referring to FIG. 5, a first embodiment of this invention comprises an input equipment 61 for analyzing an input continuous speech to an input pattern A of a sequence of feature vectors Ai's. The input equipment comprises a microphone and a Q-channel spectrum analyzer composed of a group of channel filters and analogue/digital (A/D) converters. The Q-channel spectrum analyzer may be of the type referred to as "Frequency Selectors" shown in FIG. 3 of page 60 in an article entitled "Automatic Word Recognition" described in IEEE Spectrum Vol. 8, No. 8 (August, 1971). The input speech is converted to an electric signal by the microphone. The signal is then applied to the channel filters in which the input signal frequency is divided in to Q-channel signals. These signals are supplied to the A/D converters in which they are sampled in synchronism with an analyzing clock and converted to digital signals representative of a feature vector $a_i = (a_{1i}, a_{2i}, \ldots a_{Qi})$. This input equipment 61 also generates start and final signals representing start and final time points ($i = 1$ and I) of the input pattern when an amplitude of the input signal first and finally exceeds a predetermined threshold level. The time point $i$ of the input pattern A is counted by a counter (not shown) in the equipment 61 by resetting it to 1 in response to the start signal and counting it in synchronism with the analyzing clock. A counting number of the counter at a time point of the final signal U is defined as a time period I of the input pattern A. The final signal U the time-period representing signal $I_1$ supplied to a controller 60.

The feature vector $a_i$ is in turn supplied from the input equipment 61 to an input pattern buffer memory 62. The memory 62 has a capacity sufficient to store all the feature vectors $a_i$'s in the input pattern A, i.e., $a_1, a_2, \ldots a_i, \ldots a_I$.

Reference word patterns $B^n(n = 0-9)$ are stored in a reference pattern memory 63. The reference word pattern B designated by a signal $n$ from the controller 60 is read out. A partial similarity measure calculating unit 64 calculates through sub-step (1-3) the similarity measure $S(A(l, m), B)$ between a partial pattern $A(l, m)$ of the input pattern A and the reference word pattern B. A partial recognition unit 65 performs processing of the $$\max_{Y, l(1), l(2) \cdots l(Y-1)} \left[ \sum_{x=1}^{Y} \max_{n(X)} [S(A(l_{(x-1)}, l_{(x)}), B^{n(x)})] \right] \quad (12)$$

According to the invention, a time-normalized similarity measure is used as the similarity measure $S(A(l_{(x-1)}, l_{(x)}), B^{n(x)})$. More definitely, the partial pattern $A(l_{(x-1)}, l_{(x)})$ is represented generally by $$C = A(l_{(x-1)}, l_{(x)}) = C_1, C_2 - C_i - C_I \quad (13)$$

In the case where the reference pattern $B^{n(x)}$ is represented as in expression (3), the similarity measure $S(C, B)$ is represented by $$S(C, B) = \max_{j(i)} \left[ \sum_{i=1}^{I} s(c_i, b_{j(i)}) \right] \quad (14)$$

where $j = j(i)$

It is found that the dynamic programming is conveniently applicable to the calculation of the similarity measure of expression (14). Thus, the calculation of recurrence coefficients or cumulative quantities representative of the similarity given by $$g(i,j) = s(c_i, b_j) + \max \begin{bmatrix} g(i-1, j) \\ g(i-1, j-1) \\ g(i-1, j-2) \end{bmatrix} \quad (15)$$

where $1 \leq j \leq J$ is carried out, starting from the initial condition $$j = 1$$
$$g(1,1) = S(c_1, b_1) \quad (16)$$

and arriving at the ultimate recurrence coefficient $g(I, J)$ for $i = I$ and $j = J$. It is to be understood that, according to the recurrence formula (15), the ultimate recurrence coefficient $g(I, J)$ is the calculation of expression (14), i.e., $$S(C, B) = g(I, J) \quad (17)$$

It is noteworthy that the speed of pronunication differs 30 percent at most in practice. The vector $b_j$ which is correlated to a vector $c_i$ is therefore one of the vectors positioned in the neighbourhood of the vector $b_i$. Consequently, it is sufficient to calculate the expession (14) or (15) for the possible correspondences $(i, j)$'s satisfying $$j - r \leq i \leq j + r \quad (18)$$

which is herein called the normalized window. The integer may be predetermined to be about 30 percent of the number I or J. The provision of the normalization window given by expression (18) corresponds to restriction of the calculation of the expression (14) or (15) within a domain placed between two straight lines 25 and 26 shown in FIG. 2 as $$j = 1 + r \text{ and } j = 1 - r$$

with the boundary inclusive.

As described above, the similarity measure between the partial pattern C and the reference word-pattern B can be calculated by calculating the recurrence expression (15) under conditions of expressions (16) and (18) from $i = j = 1$ to $i = I$ and $j = J$. This means that it is possible to calculate the similarity measure $S(A(l_{(x-1)}, l_{(x)}), B^n)$ or $S(A(l,m), B)$ between the partial pattern $A(l_{(x-1)}, l_{(x)})$ or $A(l,m)$ and the reference word pattern B, and to calculate the similarity measures $S(A(l,m), B^0)$ to $S(A(l,m), B^9)$. The partial similarity measure $S<l,m>$ is defined as the maximum one in these similarity measures $S(A(l,m), B^0)$ to $S(A(l,m), B^9)$. The partial recognized result $n<l,m>$ is the numeral by which the partial similarity measure $S<l,m>$ is obtained. In other words, these relationships are given by $$S<l,m> = \max_n [S(A(l,m), B^n]$$

$$n<l,m> = \operatorname{argmax}_n [S(A(l,m), B^n]$$

These partial similarity measures and partial recognized results are calculated in regard to all the combinations of $l$ and $m$ under the condition of $l < m$ and stored. The above-mentioned process for providing the partial similarity measures and the partial recognized results is the first step in the recognizing process according to the invention.

In practice, the calculation of expression (15) from $j = 1$ to $j = J_n$ gives all of the similarity measures $S(A(l,m), B^n)$ with respect to a certain point of $l$ and to all of $m$'s satisfying $$l + J_n + r - 1 \leq m \leq l + J_n + r - 1 \quad (19)$$

The end point $m$ of the partial pattern $A(l,m)$ for normally spoken words is always included in a domain defined by expression (19). Therefore, the partial similarity measures need not be calculated out of the domain.

Figure 4:
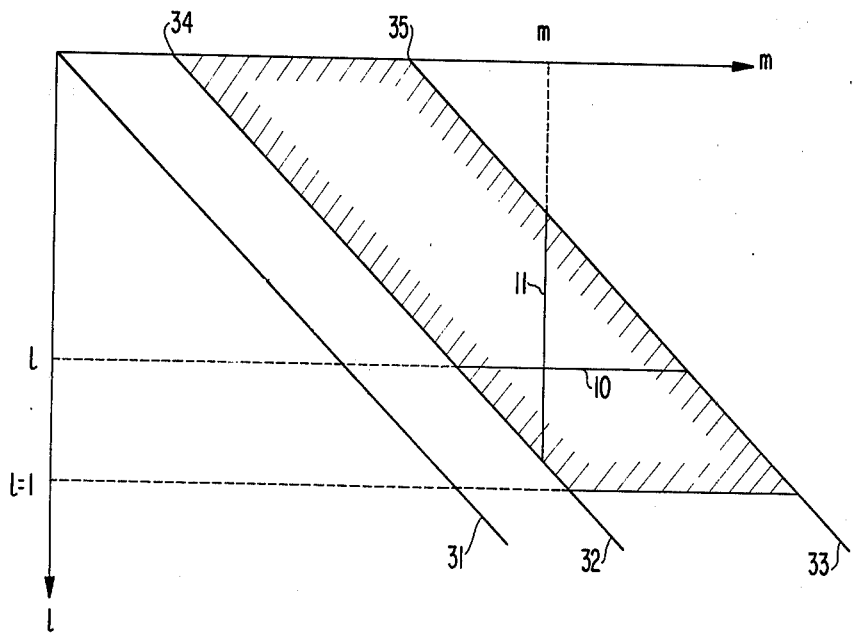
FIG. 4 is a graph for explaining the principles of this invention.

The reason will be described with reference to FIG. 4 wherein the abcissa stands for the start point $l$ and the ordinate for the end point $m$. Cross-points $(l,m)$ in the $l-m$ plane correspond to the combinations of the points $l$ and $m$ (both are integers). The domain of point $m$ in which the similarity measure $S(A(l,m), B^n)$ with respect to a certain point of $l$ is calculated is defined by expression (19). The domain depends upon the time period $J_n$ of the reference word pattern, and is given by $$l + \min_n[J_n] - r - 1 \leq m \leq l + \max_n[J_n] + r - 1 \quad (20)$$

which covers the domain lying between two straight lines 32 and 33. The similarity measures $S(A(l,m), B^n)$ are calculated within the domain to obtain the partial similarity measures $S<l,m>$ and the partial recognized results $n<l,m>$ Incidentally, the straight lines 32 and 33 are given by $$m = l + \min[J_n] - r - 1, \text{ and}$$

$$m = l + \max[J_n] + r - 1,$$

respectively,

Thus, the partial similarity measures and the partial recognized results are calculated with respect to all the points $(l,m)$ within the hatched domain in FIG. 4. Further, as described above, the calculation of similarity measures $S(A(l,m), B^n)$ with respect to all of $m$'s and to a certain point of $l$ is completed by calculating the expression (15). The similar calculations with respect to all of the reference word patterns give the similarity measures corresponding to the range of line 10 (or with sub-steps (1-4) and (1-5) with reference to the similarity measures S(A(l, m), B) obtained by the unit 64 to provide the partial similarity measures S <l, m> and the partial recognized results n <l, m>. The partial similarity measure buffer memory 66 stores the partial similarity measures S <l, m> with respect to l and m. A partial recognized result buffer memory 67 stores the partial recognized results n <l, m> with respect to l and m. A final calculating unit 68 performs the calculation of the second step described above. A final recognition unit 69 performs the recognition of the final step described above. The controller 60 controls the operations for various parts of the first embodiment.

The partial similarity measures S <l, m> stored in the memory 66 are reset by a control signal Cl from the controller 60. The memory 63 reads out the reference word pattern B(B⁰, B¹, B²... or B⁹) designated by the signal n. The controller 60 supplies a signal respresentative of the start time point in the partial pattern A(l, m) to the units 64 and 65. The unit 64 calculates the similarity measures S(A(l, m), Bⁿ) between the partial pattern A(l, m) of the input pattern A and the reference word pattern B by performing the processes of the sub-step (1-3). The unit 65 is supplied with the similarity measures S(A(l, m), Bⁿ) from unit 64, the signals n, l, and m from the controller 60, and the stored similarity measure S <l, m> from the meory 66. The unit 65 performs the processes of sub-steps (1-4) and (1-5), and updates the contents S <l, m> and n <l, m> of the memories 66 and 67, respectively, in accordance with the result thereof. When the process with respect to all of l's has been completed, the signal n from the controller 60 is in turn varied by 1 from 0 to 9. The completion of the process with respect to n to 9 means the completion of the process of the first step. At the time of the completion of the first step, the controller 60 generates and supplies to the unit 68 signals U and I2 representative of the completion of the first step and the time period (the number of the feature vectors) of the input pattern, respectively.

The unit 68 is supplied with the partial similarity measures S <l, m> and calculates the recurrence expression (23) to provide h(m) with reference to the partial similarity measures S <l, m >. The unit 69 also calculates the recurrence expression (26) referring to h(m) to obtain the number Y of the words and breaking points $\overline{l_{(x)}}$.

The unit 69 finally recognizes the input pattern A as expression (27) referring to $\overline{l(x)}$ and n < l, m >.

Figure 6:
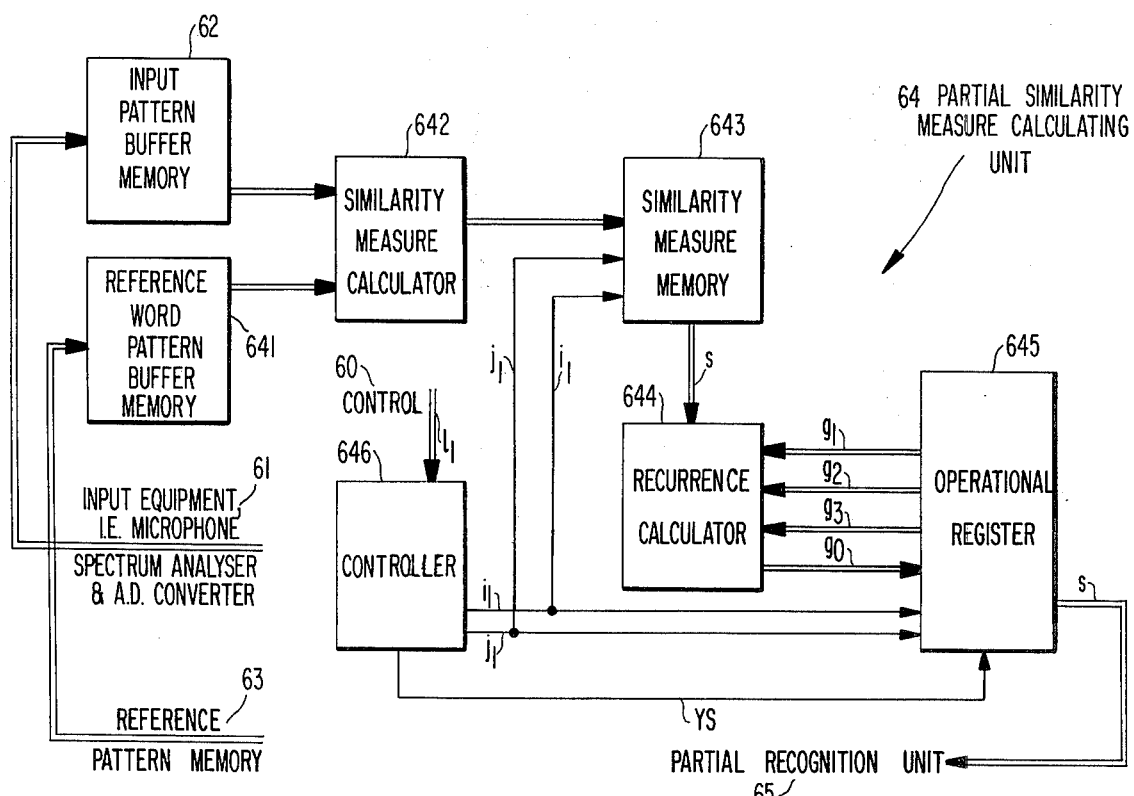
FIG. 6 is a block diagram of a partial similarity measure calculating unit used in the first embodiment.

The partial similarity measure calculating unit 64 will be described in detail with reference to FIG. 6. The unit 64 is composed of a reference word pattern buffer memory 641, a similarity measure calculator 642, a similarity measure memory 643, a recurrence calculator 644, an operational register 645 and a controller 646.

The reference word pattern B from the memory 63 (FIG. 5) is stored in the buffer memory 641. The calculator 642 is supplied with the input pattern A from the memory 62 and the reference word pattern B from the memory 641 and the similarity measure $$S(a_i, b_j) = \sum_{P=1}^{Q} (a_{pi} \times b_{pj})$$

between the feature vectors $a_i$ and $b_j$ with respect to all the combinations (i, j)'s satisfying $l \leq i \leq I$ and $1 \leq j \leq J$. The obtained similarity measures $S(a_i, b_j)$ are stored in the memory 643. The memory 643 reads out the similarity measure $S(a_i, b_j)$ corresponding to the combination (i, j) designated by signals $i_1$ and $j_1$ as a signal S. The calculator 644 is supplied with the signal S from the memory 643 and signals $g_1$, $g_2$, and $g_3$ from the register 645, and makes sum $g_0$ of the signal S and a maximum one in the signals $g_1$, $g_2$, and $g_3$, i.e., calculates the following expression:

$$g_0 = S(a_i, a_j) + \max[g_1, g_2, g_3] \tag{28}$$

The sums $g_0$'s are in turn stored in the register 645.

A control signal YS from the controller 646 is supplied to the register 645, whereby the initial condition represented by expression (16) is set. The controller 646 generates the signal $j_1$ increasing in turn from $j = 1$ and the signal $i_1$ increasing within the domain of expression (19). The similarity measure S $(a_i, b_j)$ corresponding to the combination (i, j) designated by fhe signals $i_1$ and $j_1$ is read out from the memory 643. The register 645 produces in response to the combination (i, j) designated by the signals $i_1$ and $j_1$ the signals $g_1$, $g_2$ and $g_3$ given by $$g_1 = g(i-1, j)$$

$$g_2 = g(i-1, j-1)$$

$$g_3 = g(i-1, j-2),$$

respectively. The calculator 644 calculates the expression (28) referring to the signals S, $g_1$, $g_2$, and $g_3$. This means that the calculator 644 calculates the recurrence expression (15). The obtained $g_0$ is written in the register 645. By varying i and j to i = I and j = $J_n$, the similarity measure $S(A(l, m), B^n) = g(I, J)$ can be obtained.

The following recurrence expression may be employed instead of the recurrence expression (15):

$$g(i, j) = \max \begin{bmatrix} S(a_i, b_j) + g(i - 1, j) \\ S(a_i, b_j) + g(i - 1, j - 1) \\ \frac{S(a_i, b_j) + S(i, j - 1)}{2} + g(i - 1, j - 2) \end{bmatrix}$$

or $$g(i, j) = \max \begin{bmatrix} S(a_i, b_j) + S(a_i - 1, b_j) + g(i - 2, j - 1) \\ S(a_i, b_j) + g(i - 1, j - 1) \\ \frac{S(a_i, b_j) + S(a_i, b_j - 1)}{2} + g(i - 1, j - 2) \end{bmatrix}$$

In the first embodiment, the memories 66 and 67 require a great amount of capacity. The capacity MA corresponds to the area of the hatched domain in FIG. 4, and is given by $$MA \approx I \times (\max[J_n] - \min[J_n] + 2r$$

In the case of the speech of numerals, the following examples are typical:

$$\max_n[J_n] = 25, \min_n[J_n] = 15$$

$$r = 7, I = 70 \text{ (in case of 4-digit)}$$

In the above case, the memory capacity MA is 1680 words for each memory. Therefore, the memories 66 and 67 necessitate the memory capacity of 3360 (=1680 × 2) words.

In the first embodiment, the partial similarity measures are calculated along the line 10 (FIG. 4) on which $l$ is constant in the first step, and the obtained partial similarity measures are employed along the line 11 (FIG. 4) on which $m$ is constant in the second step. This requires the storage of all of $s<l, m>$ within the hatched domain. On the other hand, it is noted that in the calculation of the expression (25), the partial similarity measure $s<h, m>$ with respect to the one point of $m$ is along the line 11. To reduce the memory capacity, a second embodiment of the invention employs this fact.

More definitely, in the second embodiment, the similarity measures $s<l, m>$ are calculated along the line 11 in the first step. When the partial similarity measure $s<l, m>$ with respect to one point of $m$ has been calculated, the recurrence expression (23) for the second step is performed. Therefore, the memory for storing the partial similarity measures $S<l, m>$ requires a small amount of capacity for which $S<l, m>$ within the range of the line 11 can be stored. Further, the similar reduction of capacity is applicable to the memory for storing the partial recognized results $n<l, m>$.

For this modification, it is necessary for the calculation of the recurrence expression (15) to reverse its time axes $i$ and $j$, i.e., initial condition $$g(I, J) = s(c_I, b_J) \qquad (29)$$

recurrence expression $$G(i, j) = s(ci, bj) + \max \begin{bmatrix} g(i+1, j) \\ g(i+1, j+1) \\ g(i+1, j+2) \end{bmatrix} \qquad (30)$$

Figure 7:
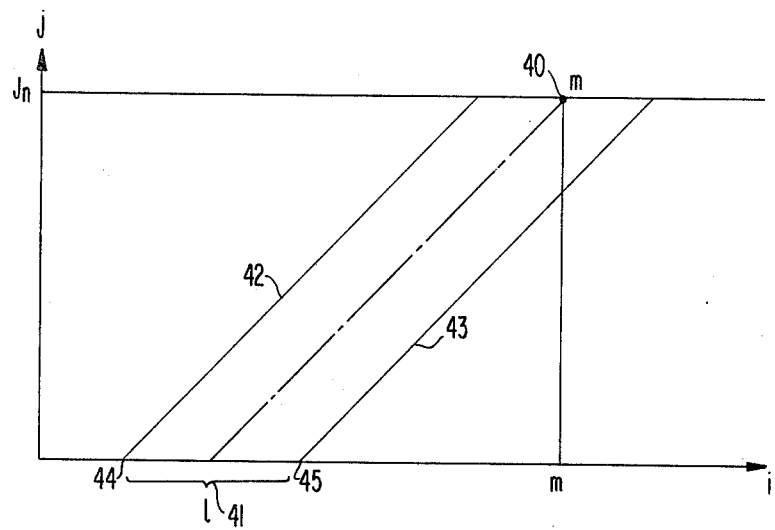
FIG. 7 is a graph for explaining the principles of a second embodiment of this invention shown in FIG. 8.

The calculation of the expressions (29) and (30) will be described referring to FIG. 7. A point 40 is of $(m, J)$ and gives the initial condition (29). Straight lines 42 and 43 correspond to the expression (18), and are represented by $$j + m - Jn - r \leq i \leq j + m - Jn + r \qquad (31)$$

Therefore, the calculation of the recurrence expression (30) is carried out within a domain placed between the lines 42 and 43 satisfying the expression (31). When the calculation has arrived at $j = 1$, all of $g(l, 1)$ with respect to $i = l$ in a range 21 are obtained.

$$g(l, 1) = S (A(l, m), B^n)$$

In this case, the range of $l$ is defined by points 44 and 45, i.e., corresponds to that of the expression (31) of $j = 1$, as represented by $$1 + m - Jn - r \leq l \leq 1 + m - Jn + r \qquad (32)$$

The similar calculations are performed with all of $B^n$ ($n = 0 \sim 9$), whereby the partial similarity measures $S<l, m>$ are obtained with respect to all of $l$'s satisfying the expression (32).

$$S<l, m> = \max_n [S (A(l, m), B^n] \qquad (33)$$

Further, the partial recognized results $n<l, m>$ are obtained $$n<l, m> = \text{argmax} [S (A(l, m), B^n] \qquad (34)$$

Thus, the partial similarity measures $S<l, m>$ and the partial recognized results $n<l, m>$ can be obtained along the line 11 (FIG. 4).

Referring to the partial similarity measures $S<l, m>$ and the partial recognized results $n<l, m>$, the recurrence expression (23) is calculated to provide $T(m)$ and $N(m)$, which are given by $$N(m) = n < h(m), m > \qquad (35)$$

In the final recognition step, the recognition is performed by referring $h(m)$ and $N(m)$. In other words, the calculation of recurrence expression given by $$\left. \begin{array}{l} h = h(m) \\ N = N(m) \\ m = h \end{array} \right\} \qquad (36)$$

is carried out, from the initial condition $$m = 1 \qquad (37)$$

to $m = 0$.

Figure 8:
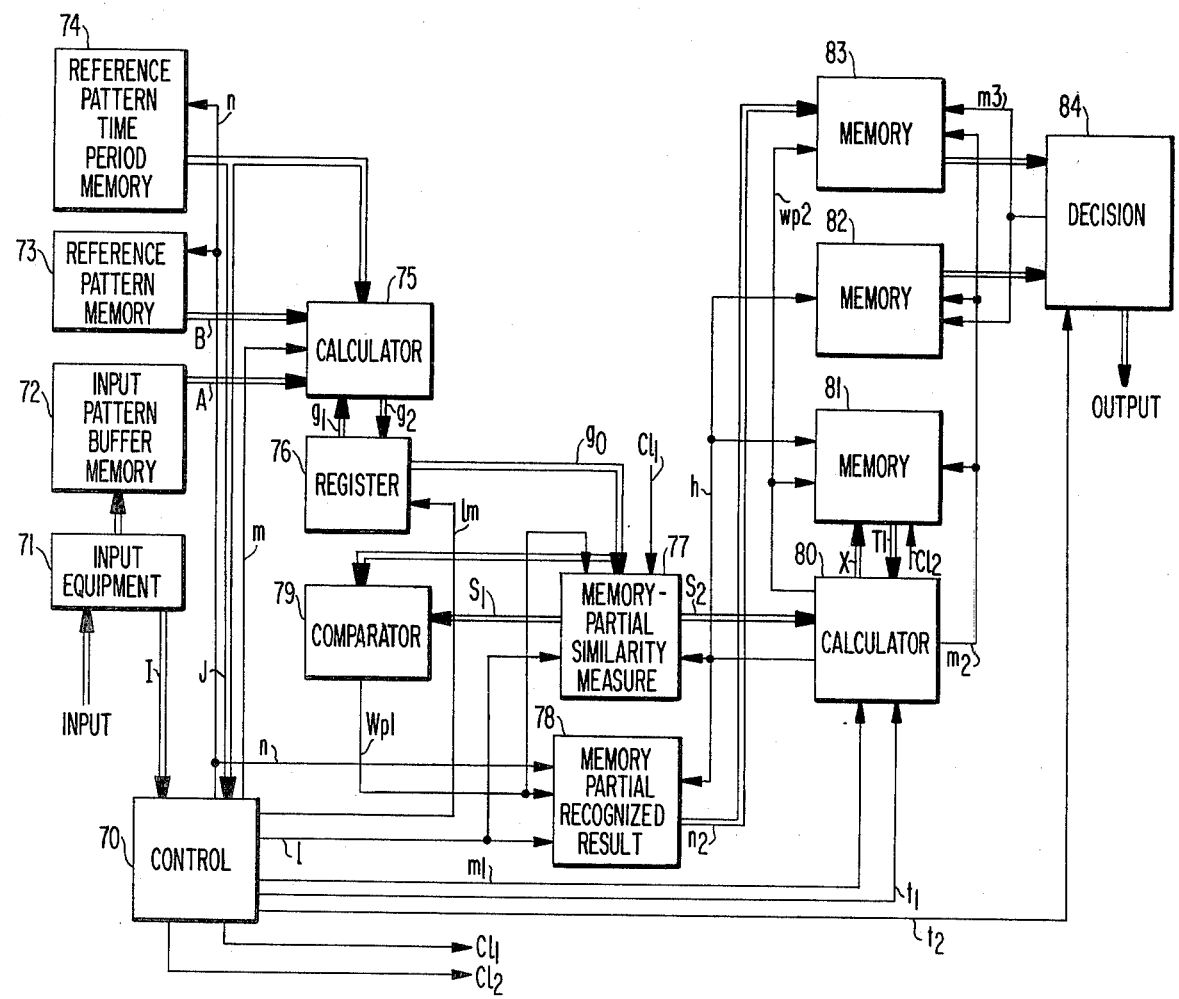
FIG. 8 is a block diagram of the second embodiment of this invention.

Referring to FIG. 8, a second embodiment comprises an input equipment 71, an input pattern buffer memory 72, and a reference pattern memory 73 identical to the input equipment 61, the memories 62 and 63 (FIG. 5), respectively. A reference pattern time period memory 74 stores the time periods $Jn$ ($n = 0 \sim 9$), and reads out the designated time period $J$ in response to the signal $n$. A first calculator 75 calculates the recurrence expression (30). A first operable register 76 stores $g(i, j)$ of expression (30). A memory 77 stores the partial similarity measures $S<l, m>$ of expression (33). A memory 78 stores the partial recognized results $n<l, m>$ of expression (34). The memories 77 and 78 have one-dimensional addresses. At the address "$l$" of the memories 77 and 78, the partial similarity measure $S<l, m>$ and the partial recognized results $n<l, m>$ are stored, respectively. A comparator 79 calculates the partial similarity measure $S<l, m>$.

A second calculator 80 performs calculations of the recurrence expressions (23) and (35). A memory 81 stores $T(m)$ obtained from the expression (23). A memory 82 stores $h(m)$. A memory 83 stores $N(m)$ obtained from the expression (35). A recognition unit 84 calculates the expressions (36) and (37) to obtain the final result. A controller 70 controls the operations of various parts.

Figure 9:
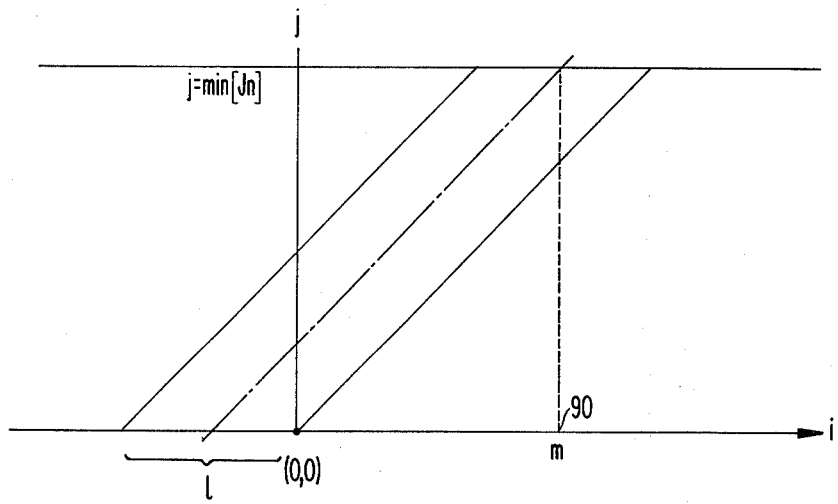
FIG. 9 is a graph for explaining the principles of the second embodiment.

When the end of the input pattern A is detected by the input equipment 71, the signal I representative of the time period of the input pattern A is supplied to the controller 70. The controller 70 sets to 1 a counter, which is installed therein and generates a counting value representative of the ending point $m$ of the partial pattern A($l, m$). When the end point $m$ has a small value or, in other words, when the point m lies in the lefthand region with respect to a point 90 of FIG. 9, the corresponding start point lies in a negative range. Therefore, the operation of this system is not initiated until the value of $m$ exceeds the point 90. The value of the point 50 on the i-axis is defined by $$m = \min[Jn] - r + 1 \qquad (38)$$

After the value exceeds $m$ defined by the expression (38), the following operations are carried out with respect to each value of $m$'s. The controller 70 varies the signal $n$ representative of numerals 0 to 9. In accordance with the designated $n$, the processes of the first and second steps are performed.

The signal J representative of the time period $J_n$ of the reference word pattern $B^n$ is generated in accordance with the signal $n$. At the same time, the reference word pattern $B^n$ is read out from the memory 73 as the signal B. The signal B is read out in time-reversed fashion, i.e., in an order of $b_J, b_{J-1} \ldots b_2, b_1$. The feature vector $a_i (i \leq m)$ is then read out from the memory 72 and is supplied to the first calculator 75, in which the calculation of the recurrence expression (30) is achieved with the register 76 used as a sub-memory. The first calculator 75 and the register 36 may be of the partial similarity measure calculating unit 64 shown in FIG. 5. When the calculation of the recurrence expression (30) is completed, the similarity measures $S(A(l, m), B^n)$ with respect to the domain given by the expression (32) is obtained.

The content of the memory 77 is reset to 0 by the signal $cl_1$ from the controller 70 before the start of the operation. Every similarity measure $S(A(l, m), B^n)$ is compared with the content of the memory 77, and the greater one is written in the memory 77, whereby the calculation of the expression (33) is carried out. More definetely, the $S(A(l, m), B^n)$ designated by the signal $lm$ from the controller 70 is read out from the register 76 as the signal $g\,o$, the $S<l, m>$ stored at address "$l$" of the memory 77 is read out as the signal $S_1$. The comparator 79 generates a write-in pulse $wp_1$ only when the signal $g\,o$ is greater than the signal $S_1$. When the write-in pulse $wp_1$ is obtained, the signal $g\,o$, i.e., $S(A(l, m), B^n)$ is written in at address "$l$" of the memory 77 as a new $S<l, m>$ and the $n$ corresponding thereto is written in at address "$l$" of the memory 78 as a new $n<l, m>$. Therefore, when the calculation has been performed by varying within a domain of the expression (32), and varying $n$ from 0 to 9, the partial similarity measure $S<l, m>$ and the partial recognized results $n<l, m>$ are stored in the memories 77 and 78, respectively. The timing signal $t_1$ is then generated from the controller 70 and is supplied to the second calculator 80. The content of the memory 81 is set to 0 by the signal $cl_2$ generated in the controller 70 at the start point of the input pattern. The second calculator 80 calculates the expression (23) with respect to m designated by signal $m_1$ from the controller 70 in response to the timing signal $t_1$.

Figure 10:
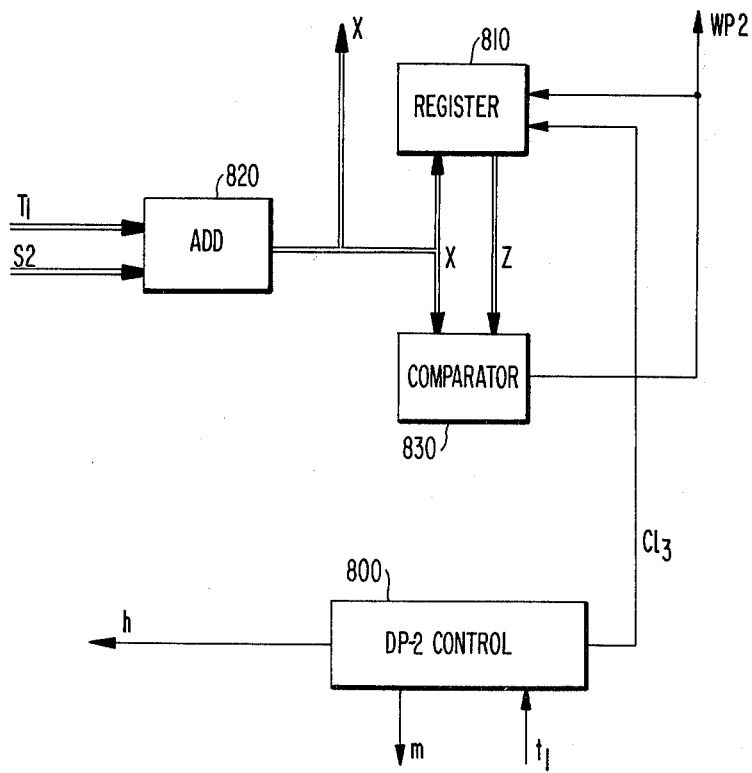
FIG. 10 is a block diagram of a second calculator used in the second embodiment.

The second calculator 80 will be described with reference to FIG. 10. The second calculator 80 comprises a controller 800, a register 810, an adder 820, and a comparator 830. The register 810 is set to 0 in response to a reset signal $cl_3$ generated in the controller 800 timed under the timing signal $t_1$. An address designating signal $h$ is varied within the domain of the expression (32). The content at address "$h$" of the memory 77, i.e., $S<h, m>$ and the content at address "$h$" of the memory, i.e., $n<h, m>$ are read out as the signals $S_2$ and $n_2$, respectively. The content at address "$h$" of the memory 81, i.e., $T(h)$ is obtained as the signal $T_1$. The signals $T_1$ and $S_2$ are added to each other in the adder 820, whereby the result, i.e., $(S(h+m) + T(h))$ is obtained as a signal X. The register 810 and the comparator 830 operate similar to that of the memory 77 and the comparator 79, i.e., calculate the maximization of the expression (23). In other words, the output X from the adder 820 is compared with the content Z of the register 810, whereby a write-in pulse $wp_2$ is generated only when $X > Z$. In response to the write-in pulse $wp_2$, the signal X is written-in in the register 810 and at address "$m$" of the memory 81. The signals $n_2$ and $h$ are written-in in the memories 82 and 83 at address "$m$" designated by the signal $n_2$. Thus, $T(m)$, $h(m)$ and $N(m)$ are stored at address "$m$" in the memories 81, 82 and 83, respectively.

Thus, the calculation with respect to a given point of $m$ is completed. Then, the signal is increased by 1, and the similar calculation is repeated until the signal $m$ becomes I.

When the calculation with respect to $m = I$ is completed, the recognition unit 84 starts to operate in response to the timing signal $t_2$ from the controller 30. Under this state, the data $h(m)$ and $N(m)$ stored in the memories 82 and 83 correspond to ones with respect to $m = 1 - I$. The recognition unit 84 comprises means for generating a signal $m_3$ designating $m$. The signal $m_3$ is supplied to the memories 82 and 83, which supply $h(m)$ and $N(m)$ to the unit 44. The unit 44 calculates the expression (37) and generates N as the final recognition result.

What is claimed is:

1. A speech pattern recognition system for continuous speech composed of a series of words pronounced word by word, said system comprising:
   means for producing from said continuous speech an input pattern A representative of time sequences of feature vectors $a_1, a_2 - - - a_i, - - - a_I$;
   first memory means for storing said input pattern A;
   second memory means for storing $n$ reference word patterns $B^n$, each representing by time sequences of feature vectors $b_1^n, b_2^n, - - -b_j^n, - - - b_{jn}^n$;
   means for reading out a partial pattern $A(l,m)$ which is a part of said input pattern A extending from a time point $l$ to another time point $m$ ($1 \leq l < m \leq I$), said partial pattern $A(l,m)$ being represented by time sequence of feature vectors $a_{l+1}, a_{l+2}, - - - a_i, - - - a_m$;
   first means for calculating through dynamic programming similarity measures $S(A(l,m), B^n)$ between said partial pattern $A(l,m)$ and said reference word pattern $B^n$;
   means for extracting the maximum value of the partial similarity measures $S<l,m>$ with respect to $n$ words;
   means for providing a partial recognized result $n<l,m>$ which is a word in said $n$ words and by which said partial similarity measure $S<l,m>$ is obtained;
   third memory means for said partial similarity measure $s<l,m>$ and said partial recognized result $n<l,m>$ obtained with respect to said time points $l$ and $m$;
   means for dividing said input pattern A to Y partial patterns $A(l_{(x-1)}, L_{(x)})$ (X = 1, 2, 3, - - - Y), said input pattern A being composed of Y words and having (Y − 1) breaking points $l_{(1)}, l_{(2)} - - - l_{(x)} - - - l_{(Y-1)}$;
   means responsive to said partial similarity measure $S<l,m>$ and said partial recognized result $n<l,m>$ for reading out the partial similarity measures $S<O,l_{(1)}>, S<l_{(1)},l_{(2)}>, - - - S<l_{(x-1)}, l_{(x)}>, - - - S<l_{Y-1}, l_{(Y)}>$ with respect to the combinations $(O,l_{(1)}), (l_{(1)}, l_{(2)}), - - - (l_{(x-1)}, l_{(x)}), - - - (l_{(Y-1)}, l_{(Y)})$ of said breaking points;
   second means for calculating the maximum value of the sum of said partial similarity measures $S>O,l_{(1)}> +S<l_{(1)}, l_{(2)}> + - - - + S<l_{(x-1)}, l_{(x)}> - - - + S<l_{(Y-1)}, l_{(Y)}>$; and
   means responsive to said second calculating means and said partial recognized result $n, m$ for providing Y words.

2. A speech pattern recognition system as recited in claim 1 wherein said first means for calculating similarity measures comprises:

recurrence coefficient calculating means for successively calculating recurrence coefficients $g(i, j)$ for each similarity quantity $s(c_i, b_j)$ defined as $$g(i, j) = s(c_i, b_j) + \text{Max} \begin{bmatrix} g(i-1, j) \\ g(i-1, j-1) \\ g(i-1, j-2) \end{bmatrix}$$

starting from the initial condition
$j = 1$ $$g(1, 1) = s(c_1, b_1)$$

and arriving at the ultimate recurrence coefficient $g(I, J)$ for $i = I$ and $j = J$ within a domain of $m$'s satisfying the expression $$l + J_n + r - 1 \leq m \leq l + J_n + J_n + r - 1$$

to obtain said similarity measures.

3. A speech pattern recognition system as recited in claim 1 wherein said first means for calculating similarity measures comprises:

recurrence coefficient calculating means for successively calculating recurrence coefficients $g(i, j)$ for each similarity quantity $S(C_i, b_j)$ defined as $$g(i, j) = s(c_i, b_j) + \text{Max} \begin{bmatrix} g(i+1, j) \\ g(i+1, j+1) \\ g(i+1, j+2) \end{bmatrix}$$

starting from the initial condition $j = 1$ $$g(1, 1) = s(c_1, b_1)$$

and arriving at the ultimate recurrence coefficient $g(I, J)$ for $i = I$ and $j = J$, and a first register for storing said recurrence coefficients $g(i, j)$.

4. A speech pattern recognition system as recited in claim 2 wherein said second means for calculating the maximum value of the sum of said partial similarity measures comprises:

first recurrence calculating means for calculating the expression $$T(m) = \text{Max} [S <h, m> + T(h)] \, h<m$$

where $m = 1 - I$,
starting from the initial condition $T(O) = 0$ and continuing to $T(I)$ from $m = I$ to provide $h(m)$ defined as $$h(m) = \text{argmax} [S <h, m> + T(h)] \, h < m$$

where the operator "argmax" stands for "$h$" for which the expression in the square bracket [ ] has a maximum value, with reference to said partial similarity measures $S <l, m>$, and second recurrence calculating means for calculating the expression $$\overline{l}_{(x)} = h(l_{(x+1)})$$

from the initial condition $l_{(r)} = J$ to the ultimate recurrence coefficient $l(O) = 0$ referring to $h(m)$ to obtain the number $Y$ of the words and breaking points $\overline{l}_{(x)}$.

5. A speech pattern recognition system as recited in claim 3 wherein said second means for calculating the maximum value of the sum of said partial similarity measures comprises:

recurrence calculating means for calculating the expression $$T(m) = \text{Max} [S <h, m> + T(h)] \, h<m$$

where $m = 1-I$,
starting from the initial condition $T(0) = 0$ and continuing to $T(I)$ for $m = I$ to provide $T(m)$, $N(m)$ and $h(m)$ defined as $$N(m) = n <h(m), m>$$

$$h(m) = \text{argmax} [S <h, m> + T(h)] \, h < m$$

where the operator "argmax" stands for "$h$" for which the expression in the square bracket [ ] has a maximum value, with reference to said partial similarly measures $S <l, m>$, and fourth memory means for storing the calculated values $T(m)$, $N(m)$ and $h(m0)$.

* * * * *

UNITED STATES PATENT AND TRADEMARK OFFICE
CERTIFICATE OF CORRECTION

PATENT NO. : 4,059,725
DATED : November 22, 1977
INVENTOR(S) : Hiroaki Sakoe

It is certified that error appears in the above-identified patent and that said Letters Patent are hereby corrected as shown below:

IN THE SPECIFICATION:

Column 1, line 21, after "of", insert --the--.

Column 3, the following equations contain ___ rather than ---

(1), also line 5; (2), also line 20; (3), also line 28; (4), (5), (6), (9), (10) and (13).

Column 3, line 6, delete "$a_i = (a_{1i}, a_{2i}, \underline{\quad} a_{Qj})$" and insert --$a_i = (a_{1i}, a_{2i}, --- a_{Qi})$--.

Column 3, line 64, delete "pheneme" and insert --phoneme--.

Column 3, line 67, delete "of" and insert --for--.

UNITED STATES PATENT AND TRADEMARK OFFICE
CERTIFICATE OF CORRECTION

PATENT NO. : 4,059,725
DATED : November 22, 1977
INVENTOR(S) : Hiroaki Sakoe

It is certified that error appears in the above-identified patent and that said Letters Patent are hereby corrected as shown below:

Column 4, line 18, delete "$s(ai,\bar{b}j)$" and insert --$s(a_i,\bar{b}_j)$--.

Column 4, line 46, delete "(9" and insert --(9)--.

Column 4, line 62, delete "$1(1),1(2) --- 1(Y - 1)$" and insert --$1_{(1)}, 1_{(2)} --- 1_{(Y-1)}$--.

Column 5, line 18, in equation (14), delete "$s(ci, bj(1))$" and insert --$S(c_i, b_{j(1)})$--.

Column 5, line 29, in equation (15), delete "s" and insert --S--.

UNITED STATES PATENT AND TRADEMARK OFFICE
CERTIFICATE OF CORRECTION

PATENT NO. : 4,059,725
DATED : November 22, 1977
INVENTOR(S) : Hiroaki Sakoe

It is certified that error appears in the above-identified patent and that said Letters Patent are hereby corrected as shown below:

Column 5, line 37, delete "(16" and insert --(16)--.

Column 6, lines 14 and 16, after "$B^n$", insert --)--.

Column 8, line 21, delete "$1_{(}x)$" and insert --$1_{(x)}$--.

Column 8, line 40, delete "in to" and insert --into--.

Column 9, line 27, delete "meory" and insert --memory--.

Column 9, line 34, before "9", delete "to" and insert --of--.

Column 9, line 44, delete "69" and insert --68--.

Column 9, line 48, delete "$\overline{1_{(}x)}$" and insert --$\overline{1_{(x)}}$--.

UNITED STATES PATENT AND TRADEMARK OFFICE
CERTIFICATE OF CORRECTION

PATENT NO. : 4,059,725
DATED : November 22, 1977
INVENTOR(S) : Hiroaki Sakoe

It is certified that error appears in the above-identified patent and that said Letters Patent are hereby corrected as shown below:

Column 9, line 62, delete "S(ai, bj)" and insert --$S(a_i, b_j)$--.

Column 10, lines 38, 39, 40, 45, 46 and 47, in all instances, delete "ai, bj" and insert --$a_i, b_j$--.

Column 10, line 54, delete "≈" and insert --≅--.

Column 11, lines 4, 7, 11 and 13, delete "s" and insert --S--.

Column 11, line 30, delete "G" and insert --g--.

Column 11, lines 59 and 64, after "$B^n$", insert --)--.

Column 13, line 6, delete "$a_i$" and insert --ai--.

UNITED STATES PATENT AND TRADEMARK OFFICE
CERTIFICATE OF CORRECTION

PATENT NO. : 4,059,725
DATED : November 22, 1977
INVENTOR(S) : Hiroaki Sakoe

It is certified that error appears in the above-identified patent and that said Letters Patent are hereby corrected as shown below:

Column 14, line 28, delete "$b_{jn}^{n}$" and insert --$b_{Jn}^{n}$--.

Column 14, line 47, delete "s" and insert --S--.

Column 14, line 59, delete "$l_{Y-1)},$" and insert --$l_{(Y-1)},$--.

Column 14, line 64, delete "$S > 0$" and insert --$S < 0$--.

Column 16, lines 6 and 32, delete "$h < m$" and insert on next line under "Max".

Column 16, line 10, delete "from" and insert --for--.

Column 16, lines 12 and 39, delete "$h < m$" and insert on next line under "argmax".

UNITED STATES PATENT OFFICE
CERTIFICATE OF CORRECTION

Patent No. 4,059,725            Dated November 22, 1977

Inventor(s) Hiroaki Sakoe

It is certified that error appears in the above-identified patent and that said Letters Patent are hereby corrected as shown below:

Column 16, line 46, delete "h (m0)" and insert -- h(m) --.

Signed and Sealed this

Eighteenth Day of April 1978

[SEAL]

Attest:

RUTH C. MASON
*Attesting Officer*

LUTRELLE F. PARKER
*Acting Commissioner of Patents and Trademarks*